United States Patent
Bigand et al.

(10) Patent No.: US 8,610,051 B2
(45) Date of Patent: Dec. 17, 2013

(54) INCREMENTAL OPTICAL ENCODER

(75) Inventors: Jean-Louis Bigand, Vendome (FR); Marie Brisse, Villermain (FR)

(73) Assignee: Thales, Neuilly sur Seine (FR)

( * ) Notice: Subject to any disclaimer, the term of this patent is extended or adjusted under 35 U.S.C. 154(b) by 247 days.

(21) Appl. No.: 12/974,192

(22) Filed: Dec. 21, 2010

(65) Prior Publication Data

US 2011/0215230 A1 Sep. 8, 2011

(30) Foreign Application Priority Data

Dec. 23, 2009 (FR) .................................... 09 06272

(51) Int. Cl.
*G01D 5/34* (2006.01)
(52) U.S. Cl.
USPC ................................................... 250/231.14
(58) Field of Classification Search
USPC ....................................... 250/231.13–231.18
See application file for complete search history.

(56) References Cited

U.S. PATENT DOCUMENTS

| 6,271,515 B1 * | 8/2001 | Matsumoto .................... 250/239 |
| 2004/0178332 A1 | 9/2004 | Ahne et al. |
| 2006/0202114 A1 | 9/2006 | Ruttiger et al. |
| 2007/0228265 A1 | 10/2007 | Ramachandran et al. |

FOREIGN PATENT DOCUMENTS

| DE | 19529007 | 2/1996 |
| DE | 102006047471 | 4/2008 |

* cited by examiner

*Primary Examiner* — Thanh Luu
(74) *Attorney, Agent, or Firm* — Baker & Hostetler LLP (57) ABSTRACT

The invention relates to optical encoders providing binary logic signals representing increments of relative position of two elements of the encoder, the two elements being mobile with respect to one another. The encoder includes at least one pair formed of a luminous emitter and of a luminous detector which are secured to the fixed element, the emitter producing a luminous radiation that the detector can detect, and at least one mark secured to the movable element, during the motion of the movable element with respect to the fixed element, the mark being able to place itself in the path of the luminous radiation so as to be detected by the detector. The encoder further includes a plane printed circuit, secured to the fixed element and on which the pair of emitter and detector is arranged.

9 Claims, 12 Drawing Sheets

INCREMENTAL OPTICAL ENCODER

CROSS-REFERENCE TO RELATED APPLICATION

This application claims priority to foreign French patent application No. FR 09 06272, filed on Dec. 23, 2009, the disclosure of which is incorporated by reference in its entirety.

FIELD OF THE INVENTION

The invention relates to optical encoders providing binary logic signals representing increments of relative position of two elements of the encoder, the two elements being mobile with respect to one another.

BACKGROUND OF THE INVENTION

Optical encoders, for example angular, are used like potentiometers, for example for the manual control of electronic equipments which are sensitive to an input parameter that can vary continuously or almost continuously, but they are much more reliable than potentiometers. Typically, in an application in respect of aeronautical equipment, it is possible to use an optical angular encoder to indicate to an automatic piloting computer an altitude or speed setpoint that the pilot chooses by actuating a control button which causes the encoder to revolve. The reliability of the encoder and of the information that it delivers is then an essential element of the encoder.

An optical angular encoder typically includes a disc bearing regular marks, this disc being rotated using a (for example manual) control button. A photoelectric cell fixed in front of the disc detects the marks past of the successive marks when the control button causes the disc to revolve. The marks are typically apertures in an opaque disc, a light-emitting diode being placed on one side of the disc and the photoelectric cell being placed on the other side.

Each passby of a mark constitutes an increment of one unit in the counting of the rotation of the disc. The angular resolution is determined by the angular interval of the marks arranged regularly over a revolution of the disc. To detect at one and the same time increments and decrements of angle of rotation when the direction of rotation is reversed, two photoelectric cells are provided, mutually offset physically by an odd number of quarter intervals. Thus, the lit/unlit logic states of the two cells are coded on two bits which successively take the following four values: 00, 01, 11, 10 when the disc rotates in one direction and the following four successive values 00, 10, 11, 01 when the disc rotates in the other, so that it is easy to determine not only the occurrence of an increment of rotation (change of state of one of the bits) but also the direction of rotation (by comparison between a state of the cells and the immediately earlier state).

The light-emitting diodes are mounted on a fixed printed circuit. The photoelectric cells are mounted on another fixed printed circuit. A revolving disc comprising windows passes between the two printed circuits. A fixed diaphragm, interposed between the revolving disc and the printed circuit carrying the light-emitting diodes, makes it possible to improve the precision of the encoding.

This solution requires two printed circuits, wiring between the circuits and precise relative positionings of the various constituents of the device. All this returns the encoder complex and industrially difficult to produce. Moreover, the assemblage of electronic elements associated with the wiring and with the micromechanics returns this type of encoder architecture fragile.

SUMMARY OF THE INVENTION

The invention substantially simplifies the production of an optical encoder by proposing that the light-emitting diodes, or more generally the emitters, as well as the photoelectric cells or more generally the detectors, be placed on one and the same printed circuit.

The present invention provides an incremental optical encoder, comprising a movable element and a fixed element, at least one pair formed of a luminous emitter and of a luminous detector which are secured to the fixed element, the emitter producing a luminous radiation that the detector can detect, and at least one mark secured to the movable element, during the motion of the movable element with respect to the fixed element, the mark being able to place itself in the path of the luminous radiation so as to be detected by the detector, characterized in that the encoder furthermore comprises a plane printed circuit, secured to the fixed element and on which the pair of emitter and of detector is arranged.

BRIEF DESCRIPTION OF THE DRAWINGS

The invention will be better understood and other advantages will become apparent on reading the detailed description of an embodiment given by way of example, which description is illustrated by the appended drawing in which.

For the sake of clarity, the same elements will bear the same labels in the various figures.

DETAILED DESCRIPTION

Figure 1:
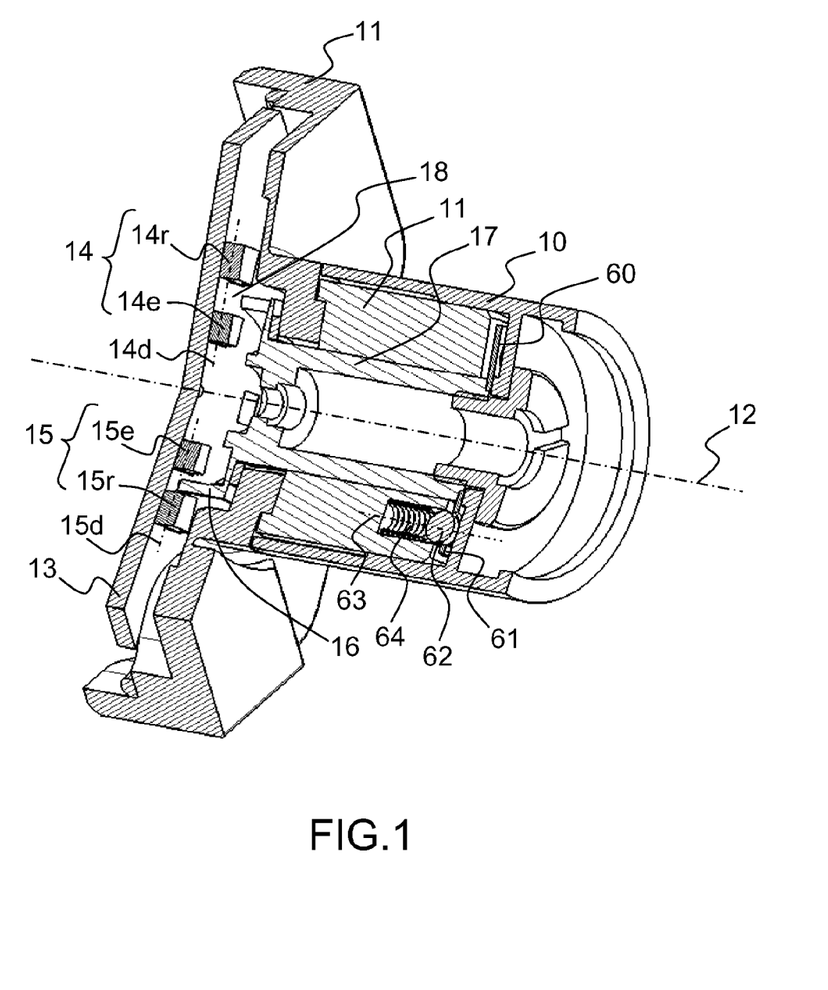
FIG. 1 represents in perspective an embodiment example of a rotary encoder according to the invention in a first embodiment implementing direct optical transmission between emitters and detectors.

FIG. 1 represents a rotary encoder comprising a movable element 10 that can move with respect to a fixed element 11.

The movable element 10 comprises for example a button that a user can rotate about an axis 12 to enter a data item into an electronic item of equipment. The movable element 10 also comprises all the parts secured to this button. The fixed element 11 comprises a housing of the encoder as well as all the parts secured to this housing. The fixed element 11 is secured to the item of equipment. The invention is described in relation to a rotary encoder but can equally well be implemented in a linear encoder. The movable element can then move in translation with respect to the fixed element.

The encoder comprises a plane printed circuit 13 secured to the fixed element 11. The encoder also comprises a bearing allowing the rotational guidance of the movable element 10 with respect to the fixed element 11. In the example represented, the plane of the printed circuit 13 is perpendicular to the axis 12. Two pairs 14 and 15 each formed of an emitter, respectively 14e and 15e, and of a detector, respectively 14r and 15r, are secured to the printed circuit 13. The emitters 14e and 15e are for example light-emitting diodes and the detectors 14r and 15r are photodetectors sensitive to the radiation emitted by the light-emitting diodes.

In this embodiment, the emitters 14e and 15e each emit a luminous radiation around a main direction parallel to the plane of the printed circuit 13. This direction is conventionally the one where the luminous intensity is the greatest. Around this direction the luminous intensity decreases to form an angular field around the main direction. It is possible to define a representation of the luminous intensity emitted by an emitter in polar coordinates. In this representation, the intensity forms a lobe centred on the main direction.

In each pair 14 and 15 the corresponding detector 14r or 15r faces the main direction around which the luminous radiation is emitted. A main direction around which the detector can detect a luminous radiation is also defined. By analogy, it is possible to define a reception lobe for each of the detectors 14r and 15r. In this embodiment, for each pair 14 and 15, the main directions of the emitter 14e or 15e and of the corresponding detector 14r or 15r are substantially merged into one and bear the same label, respectively 14d and 15d. In practice, an offset between the main directions of an emitter with respect to the corresponding detector is acceptable as long as the respective lobes are concurrent.

The encoder comprises at least one mark 16 secured to the movable element 10. During the motion of the movable element 10 with respect to the fixed element 11, the mark 16 can place itself in the path of one of the luminous radiations so as to be detected by the corresponding detector 14r or 15r.

In this embodiment, the mark 16 forms a mask that can interrupt the luminous radiation. In practice, an encoder generally possesses several marks 16 regularly distributed around the axis 12.

Figure 2:
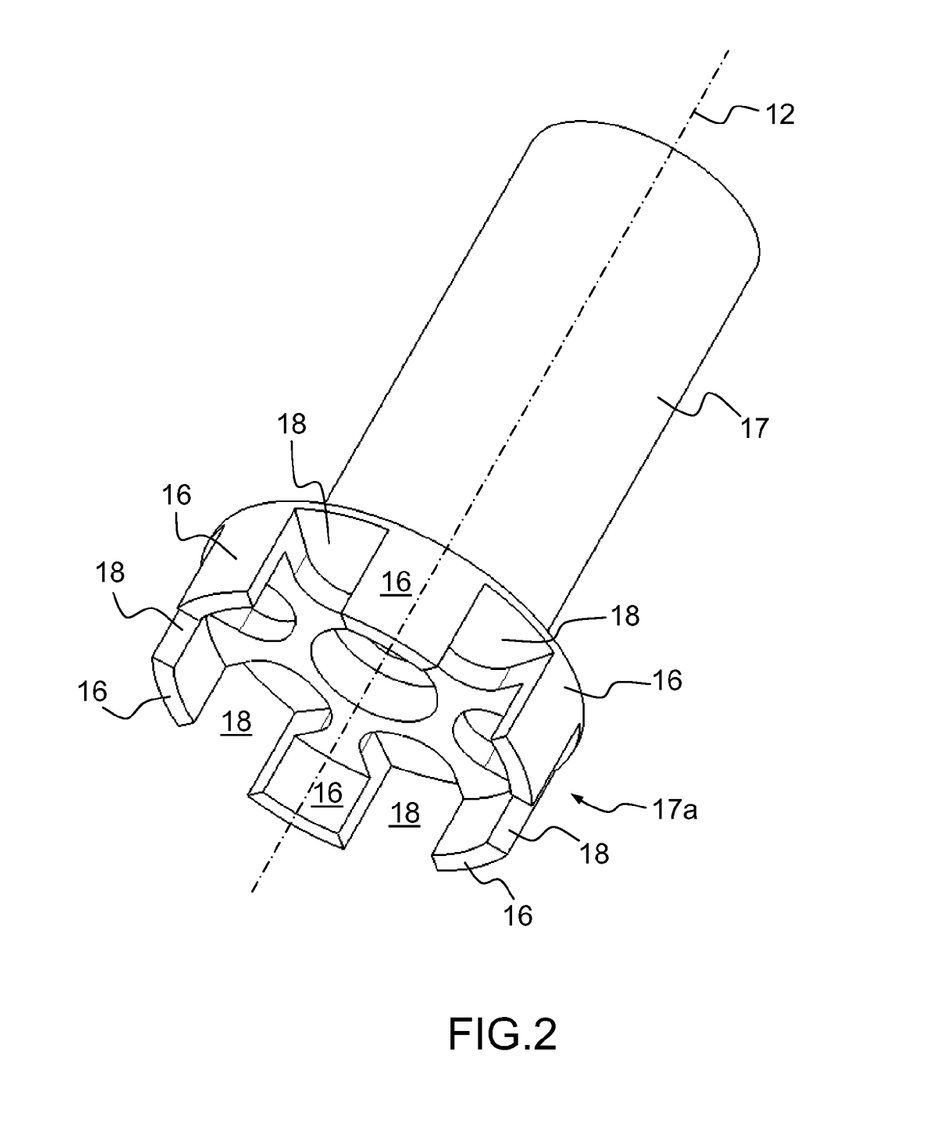
FIG. 2 represents a movable element of the first embodiment.

FIG. 2 represents a part 17 of the movable element 10 in which six marks 16 are made. The marks 16 are made in a cylindrical surface 17a with axis 12. During the rotation of the part 17 about the axis 12, the marks 16 cut the directions 14d and 15d and interrupt the progress of the radiation between one of the emitters 14e or 15e and the associated detector 14r or 15r. Between the marks 16, slots 18 are made. These slots 18 form apertures allowing the radiation arising from an emitter to reach the corresponding detector when a slot 18 is situated in the direction 14d or 15d of the pair 14 or 15 considered during the rotation of the part 17.

Figure 3:
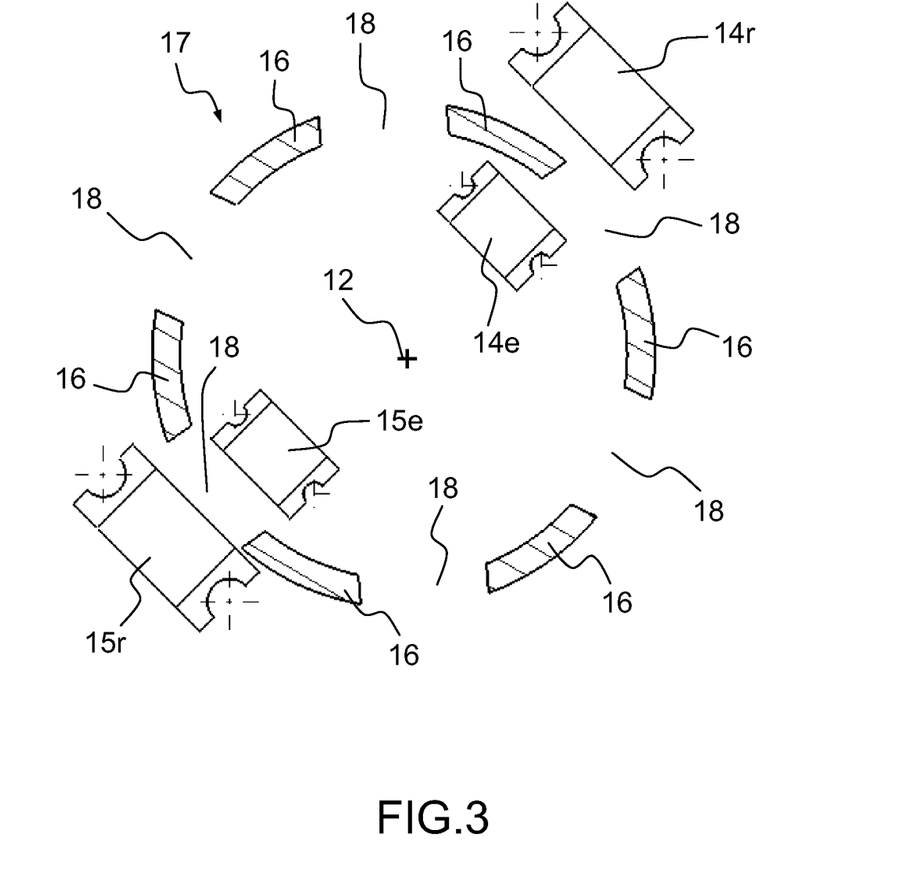
FIG. 3 represents the passage of the movable element of FIG. 2 between emitters and detectors secured to a fixed element of the encoder.

FIG. 3 represents the two pairs 14 and 15 as well as the part 17 in section in a plane perpendicular to the axis 12 and containing the directions 14d and 15d. In this view, it may be observed that the masking of the emitters 14e and 15e by the marks 16 is not complete. Indeed, the emitters 14e and 15e and the detectors 14r and 15r comprise plane surfaces parallel to the axis 12. Moreover, the marks 16 form cylindrical portions facing the plane surfaces of the emitters 14e and 15e and detectors 14r and 15r. The shutting off of the emitters 14e and 15e cannot therefore be perfect and luminous leaks can disturb the detection effected by the detectors 14r and 15r.

Figure 4:
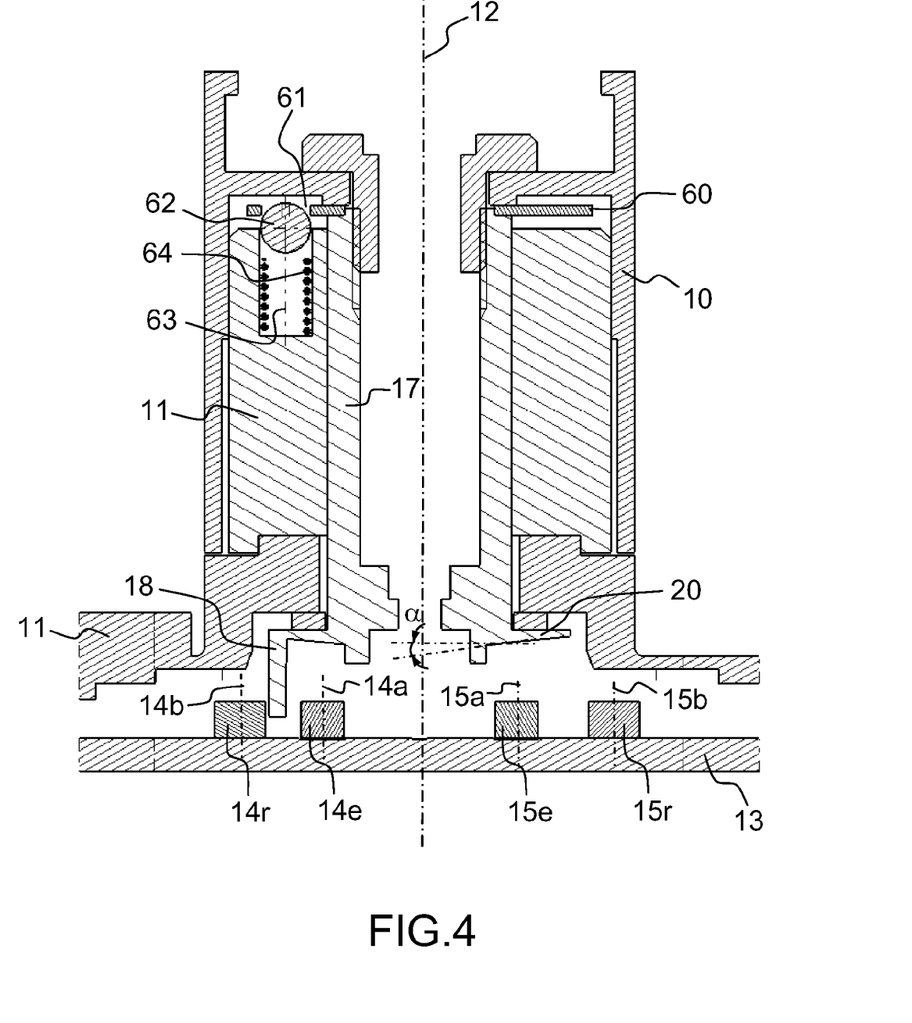
FIG. 4 represents in section a first variant of a second embodiment implementing a reflection in the transmission between emitters and detectors.

FIG. 4 represents in section a first variant of a second embodiment implementing a reflection in the transmission between the emitters 14e and 15e and the corresponding detectors 14r and 15r. Stated otherwise, a mark 20 forms an element reflecting the radiation arising from an emitter 14e or 15e towards the corresponding detector 14r or 15r.

In one embodiment, the mark 16 interrupts the luminous radiation between emitter and detector. In the second embodiment, the mark conversely allows the transmission of the radiation between emitter and detector. This is a purely conventional distinction. For both embodiments, the encoder comprises an alternation of marks and of absences of marks allowing the alternation of transmission and of interruption of the radiation between an emitter and the corresponding detector. If a mark allows transmission, then the corresponding absence of mark allows interruption. The inverse convention is equivalent: if a mark allows interruption, then the corresponding absence of mark allows transmission.

In the first embodiment, the main directions 14d and 15d are parallel to the plane of the printed circuit 13. On the other hand, in the second embodiment, the main directions denoted 14a for the emitter 14e, 14b for the detector 14r, 15a for the emitter 15e, 15b for the detector 15r are no longer parallel to the plane of the printed circuit 13. The main directions 14a, 14b, 15a and 15b face the reflecting element 20. Advantageously, the emitters 14e and 15e emit their luminous radiation around a first direction, respectively 14a and 15a, parallel to the axis 12 of rotation of the encoder and the detectors 14r and 15r receive their luminous radiation around a second direction, respectively 14b and 15b, also parallel to the axis 12. This commonly sourced type of component, emitters and detectors, exists either to be pinned onto the printed circuit 13 or to be surface-transferred onto conducting pads of the printed circuit 13. The main directions of the various components are then perpendicular to the printed circuit 13.

This arrangement in which the main directions 14a, 14b, 15a and 15b are parallel makes it possible to avoid direct coupling in a pair between emitter and detector when the reflecting element 20 does not return the radiation emitted by one of the emitters 14e or 15e. However, slots 18 can be made in the parts 17, so as to avoid possible stray radiation that may disturb the encoder.

Advantageously, the two pairs 14 and 15 are arranged on the printed circuit 13 in such a way that the main directions 14a and 15a of the emitters 14e and 15e are closer to the axis 12 of the encoder than the directions 14b and 15b of the detectors 14r and 15r. During the displacement of the movable element 10, when the reflecting element 20 faces the radiation emitted by one of the emitters 14e or 15e, the reflecting element 20 is substantially centred on the main direction 14a or 15a of the emitter 14e or 15e considered and forms an area substantially inclined with respect to the plane of the printed circuit 13. The angle of inclination α of the land is defined so as to return the radiation emitted by the emitter considered to the corresponding detector of the pair 14 or 15.

In practice, detectors 14r and 15r whose reception lobe is sufficiently wide are chosen to receive an off-centre radiation from the axis 14b or 15b, due to the position of the reflecting element 20. It is nonetheless important not to implement emitters or receivers whose lobes are too wide so as to avoid direct coupling between emitter and associated receiver.

Figure 5:
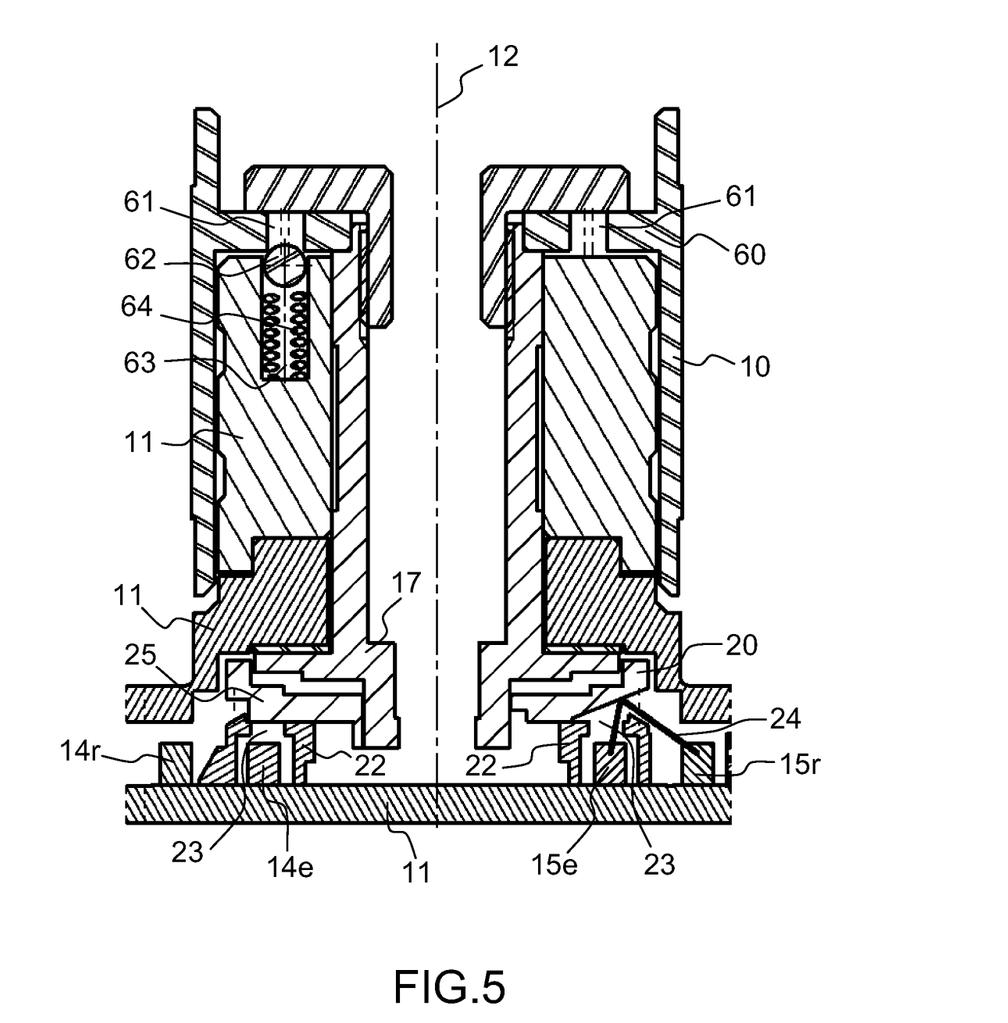
FIG. 5 represents in section a second variant of the second embodiment.

FIG. 5 represents a variant embodiment of the embodiment implementing a reflecting element 20. In this variant, the encoder comprises an opaque mask 22 secured to the printed circuit 13. The mask 22 makes it possible to limit luminous leaks and to limit the angular field of the luminous radiation. In FIG. 5, a mask 22 surrounds each of the emitters 14e and 15e. Another mask 22 can also surround each of the detectors 14r and 15r. Each mask 22 comprises a window 23 defining the angular field. Stated otherwise, the window 23 lets through a portion of the luminous radiation and fulfils a function of optical diaphragm with respect to the element (emitter or receiver) in front of which the window 23 is situated. The angular field is not necessarily centred on the main direction of the component, emitter or detector, that the mask 22 surrounds. Stated otherwise, the mask 22 makes it possible to reduce the lobe of the component that it surrounds. The dimensions and the position of the window 23 are defined as a function of the relative positions of the components of a pair and of the position of the reflecting element 20.

Represented in FIG. 5 as a heavy line 24 is the path of the radiation emitted by the emitter 15e, reflected by the reflecting element 20 and received by the detector 15r.

Advantageously, the part 17 comprises a mask 25 that can interrupt the luminous radiation by shutting off the window 23 when the reflecting element 20 does not return the radiation emitted by one of the emitters 14e or 15e. Stated otherwise, the movable element 10 comprises on either side of the reflecting element 20 a mask 25. The fact of combining a mask 22 surrounding each emitter 14e or 15e with a mask 25 shutting off the window 23 is particularly advantageous. Thus when a detector 14r and 15r must not receive any radiation, the possibility of optical leakage inside the encoder is limited right from the light source. The mask 25 makes it possible to obtain precise optical decoding by limiting the optical leaks when the reflecting mark is absent. Such leaks make it necessary to carry out a processing of the signal so as to extract the optical signal from the noise generated by the leaks. The presence of a mask 25 shutting off the window 23 makes it possible to limit this processing of the signal. In this combination the alternating succession of reflecting elements 20 and of masks 25 is substantially centred on the main direction 14a or 15a of the emitter 14e or 15e considered.

Figure 6:
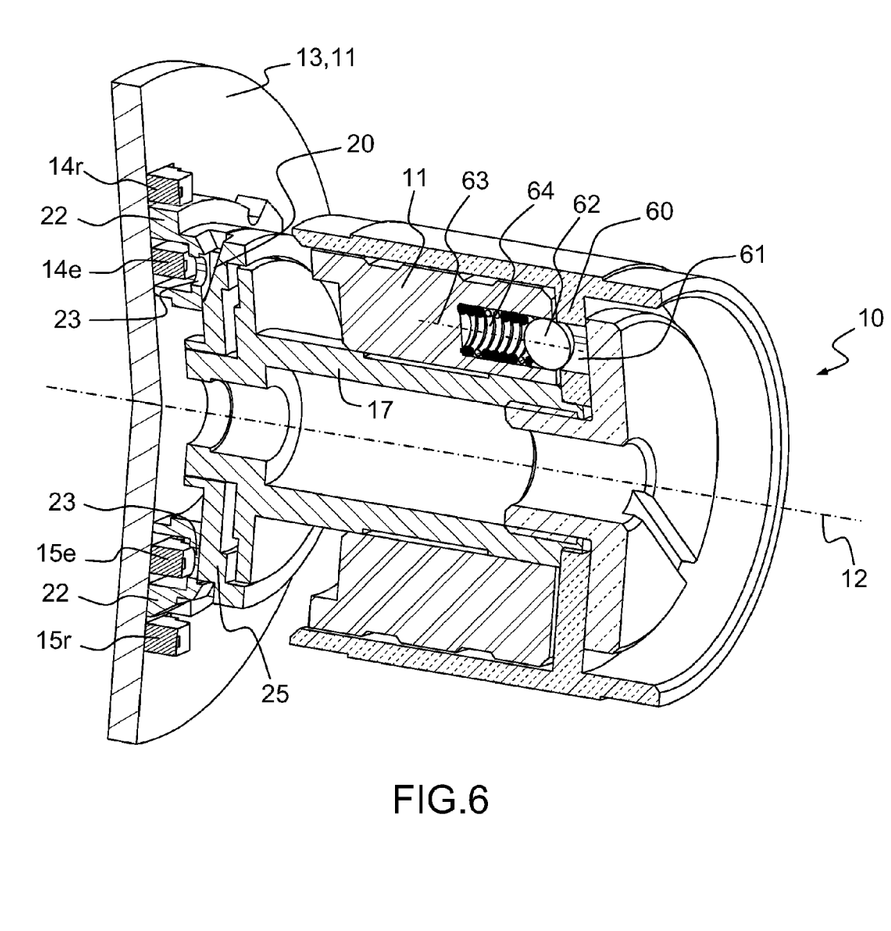
FIG. 6 represents in perspective the second variant of FIG. 5.

FIG. 6 represents in perspective the encoder of FIG. 5. In the relative position of the two elements 10 and 11 as represented in this figure, a reflecting element 20 allows the radiation emitted by the emitter 14e to be received by the detector 14r. On the other hand the emitter 15e is masked by a mask 25.

Figure 7:
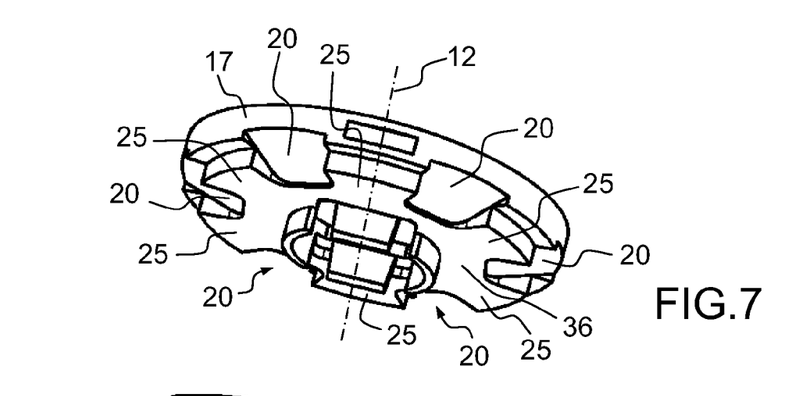
FIGS. 7 and 8 represent in perspective two parts of the encoder of FIGS. 5 and 6 that are intended to be in motion one with respect to the other.
Figure 8:
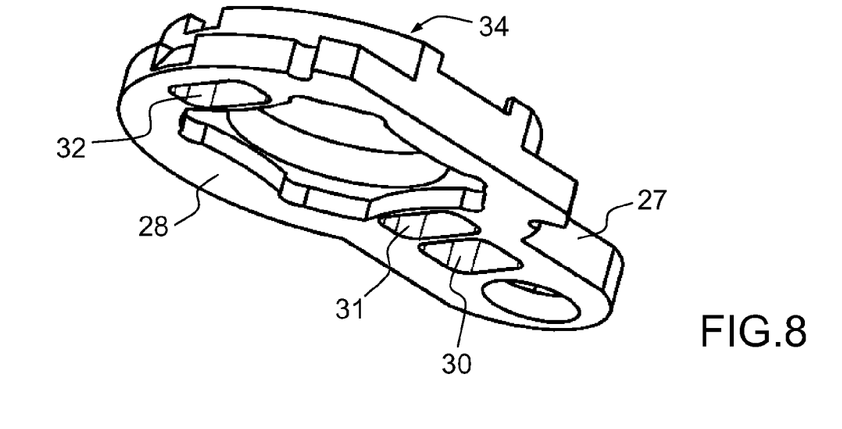

FIG. 7 represents a portion of the part 17 secured to the movable element 10 and FIG. 8 represents a part 27 secured to the printed circuit 13 and therefore fixed in the encoder. In FIG. 7 is depicted an alternating succession of reflecting elements 20 and of masks 25 each occupying an identical angular sector around the axis 12. The part 27 comprises a plane surface 28 coming into contact with the printed circuit 13. Orifices 30, 31 and 32 are made in the part 27, said orifices being fashioned so as to each receive an emitter or a detector. More precisely, the orifice 30 is designed to receive the detector 15r. The orifice 31 is designed to receive the emitter 15e and the orifice 32 is designed to receive the emitter 14e. The part 27 forms the various masks 22. The part 27 comprises a second plane surface 34 parallel to the surface 28 and intended to slide a plane surface 36 of the mobile part 17. The various masks 25 are made in the plane surface 36 and the reflecting elements 20 are made as hollows in the plane surface 36. In practice, to limit the friction in the encoder, a functional play can be left between the plane surfaces 34 and 36. This play is dependent on the chain of dimensions linking the fixed element 11 and the movable element 10 in the direction of the axis 12. Care will be taken to limit this play so as to best mask the emitters 14e and 15e when the masks 25 cover them.

Figure 9A:
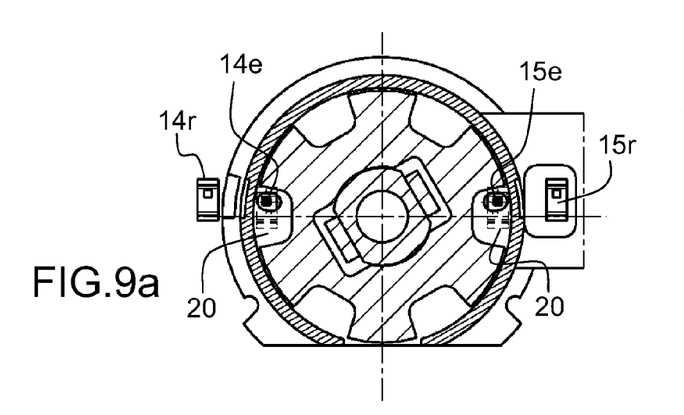
FIGS. 9a to 9d represent various relative positions of the two parts of FIGS. 7 and 8.
Figure 9B:
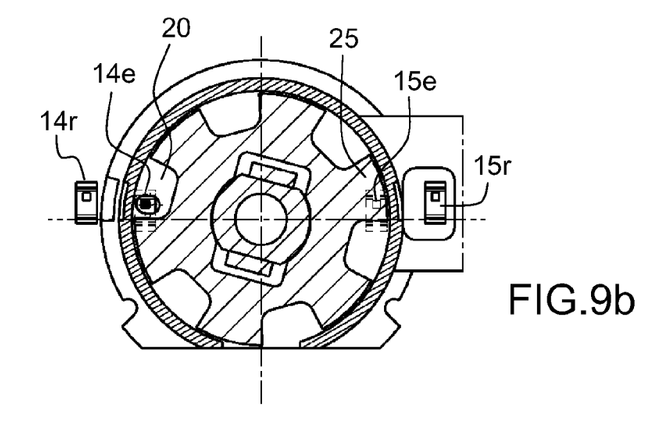
Figure 9C:
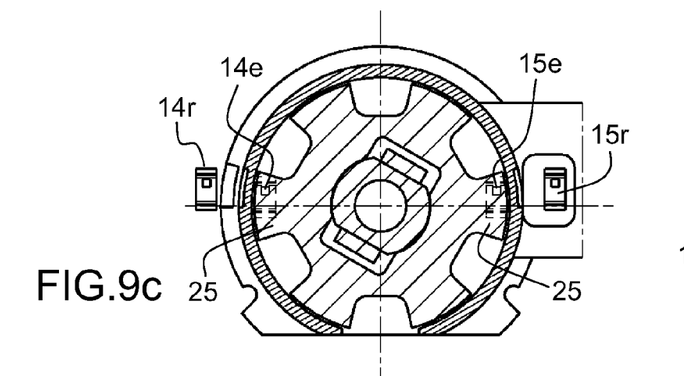
Figure 9D:
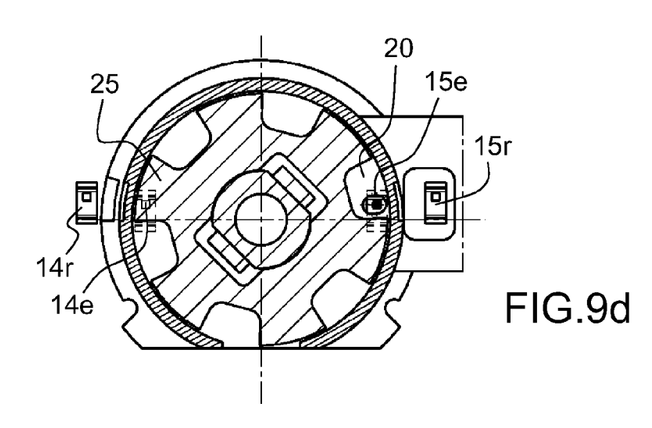

FIGS. 9a to 9d represent various relative positions of the two parts 17 and 27 represented in FIGS. 7 and 8 in a plane perpendicular to the axis 12 and cutting the part 17 in the vicinity of the plane 36. In FIG. 9a, reflecting elements 20 face the emitters 14e and 15e and the detectors 14r and 15r are both illuminated by the radiation emitted by the corresponding emitter. In FIG. 9b a reflecting element 20 faces the emitter 14e and a mask 25 faces the emitter 15e. In FIG. 9c, masks 25 face the emitters 14e and 15e and, in FIG. 9d, a mask 25 faces the emitter 14e and a reflecting element 20 faces the emitter 15e.

The alternative variants presented previously require significant precision in their construction. Notably the relative position of the detectors 14r and 15r must be dependent on the interval of increment. It's the same for the part 17, the dimensions and position of each of whose marks must be in relation to those of the detectors 14r and 15r.

Figure 10:
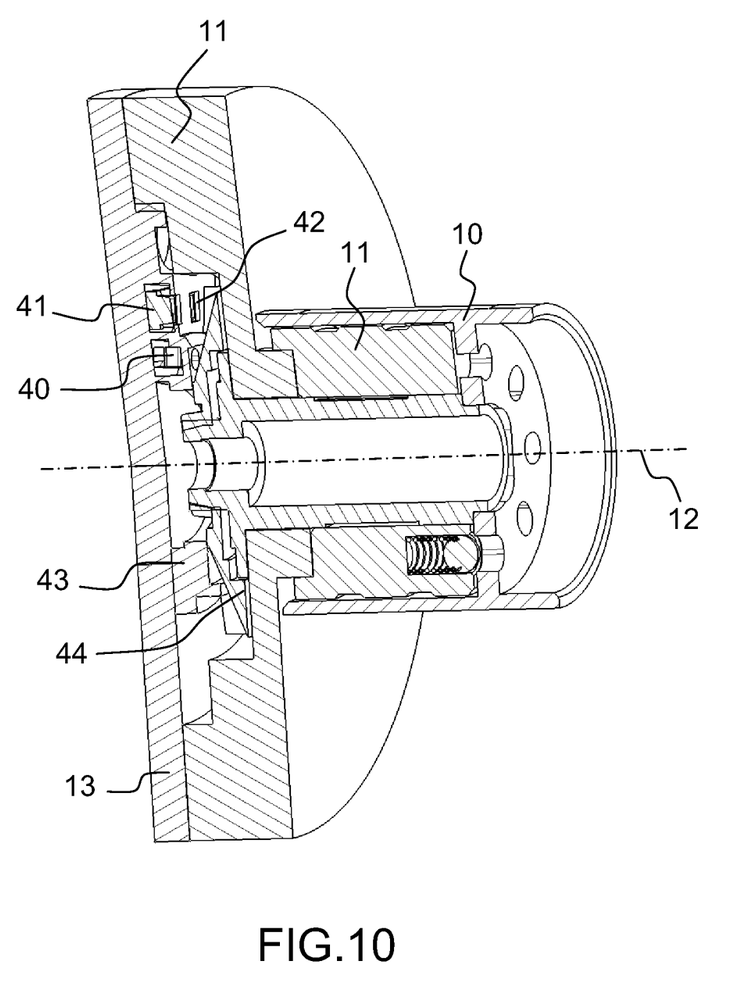
FIG. 10 represents in perspective a third variant of the second embodiment.

FIG. 10 represents another variant of the embodiment of the invention aimed at simplifying the production of an optical encoder by widening the manufacturing tolerances for certain elements of the encoder, notably the tolerances of positioning of the detectors 14r and 15r as well as the tolerances of the dimensions and positions of the marks 20 of the part 17. The variant represented in FIG. 10 implements a reflecting element 20. In this variant, an emitter 40 can cooperate with two detectors 41 and 42 situated in one another's vicinity. It is of course understood that this cooperation between an emitter and two detectors may be implemented in the embodiment described with the aid of FIGS. 1 to 3. The two detectors 41 and 42 are able to detect one and the same mark 20. The dimensions of the mark 20 are defined so as to be able to be detected either by neither of the two detectors 41 and 42, or by a single detector or by both detectors. In the variant represented, provision has been made for a single emitter 40 to be able to illuminate both detectors 41 and 42. A single emitter 40 makes it possible to reduce the number of components implanted in the printed circuit 13. It is also possible to provide an emitter dedicated to each detector 41 and 42.

A part 43 secured to the printed circuit 13 fulfils the same functions as the part 27 described above, namely the production of masks 22, notably around the two detectors 41 and 42 to allow each of them to detect independently of the other the mark 20. A part 44 secured to the movable element 10 fulfils the same functions as the part 17 described above, namely the alternation of the reflecting elements forming the marks 20 and of the masks 25.

Figure 11A:
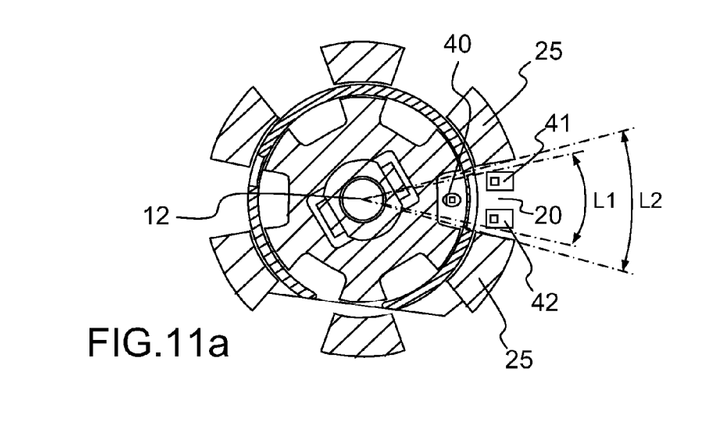
FIGS. 11a to 11d represent various relative positions of parts of the encoder of the third variant.
Figure 11B:
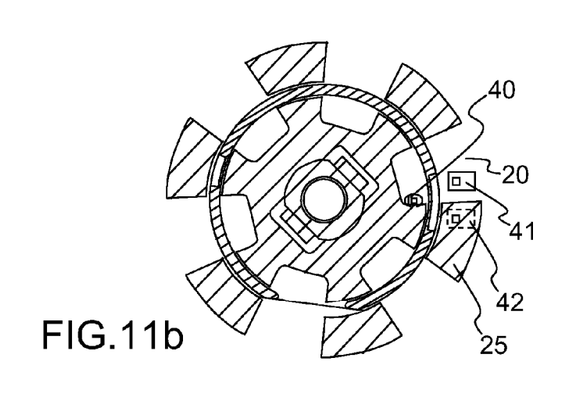
Figure 11C:
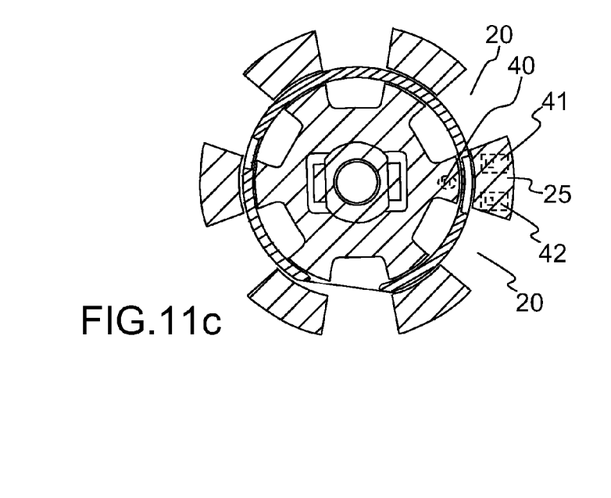
Figure 11D:
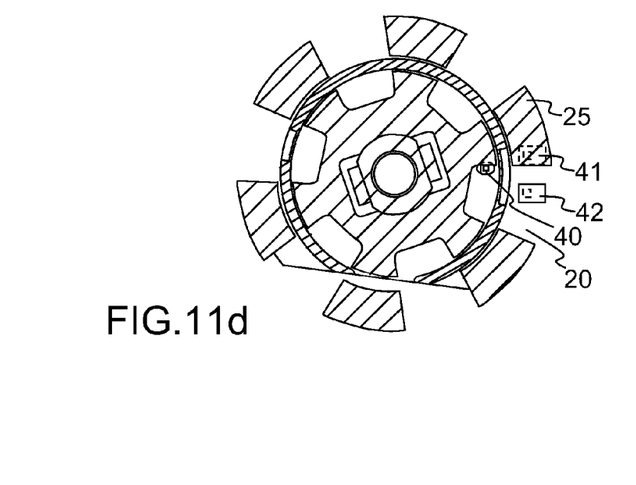

FIGS. 11a to 11d represent various relative positions of the two parts 43 and 44 represented in FIG. 10. In FIG. 11a, a reflecting element 20 makes it possible to illuminate both detectors 41 and 42. In FIG. 11b, a reflecting element 20 makes it possible to illuminate the detector 41 and a mask 25 prevents the illumination of the detector 42. In FIG. 11c, a mask 25 prevents the illumination of both detectors 41 and 42. Finally in FIG. 11d, a reflecting element 20 makes it possible to illuminate the detector 42 and a mask 25 prevents the illumination of the detector 41.

For the encoder, a measure of length is defined along the direction of the displacement of the movable element 10 with respect to the fixed element 11. For a linear encoder, this is a linear length. For a rotary encoder, the measure of length is angular.

For the variant where a mark 20 may be detected by two detectors, a length L1 of a zone of the fixed element 11 including the two detectors 41 and 42 is less than a length L2 of the mark 20. The zone is the minimum area occupied by the two detectors 41 and 42, including the space situated between the detectors 41 and 42.

The detection of the mark 20 is done on an edge of the latter. The length of the mark 20 therefore has no influence on the detection of the mark 20. The manufacturing tolerance for the mark 20 is thus widened. Indeed, the minimum length L2 of the mark 20 is the length of the zone including the two detectors 41 and 42. On the other hand the maximum length L2 of the mark 20 is not related to the length L2 of the zone but is solely dependent on the number of increments of the encoder.

Moreover, the relative position of the two detectors 41 and 42 is not dependent on the number of increments. It is therefore possible to standardize a printed circuit 13 carrying two detectors 41 and 42 for different encoders not possessing the same number of increments.

In the case of a rotary encoder, such as represented in FIGS. 10 and 11, it is preferable to place the emitter 40 nearer the axis 12 of rotation of the encoder than the detectors 41 and 42. This makes it possible to widen the positional tolerances of the detectors 41 and 42.

Figure 12:
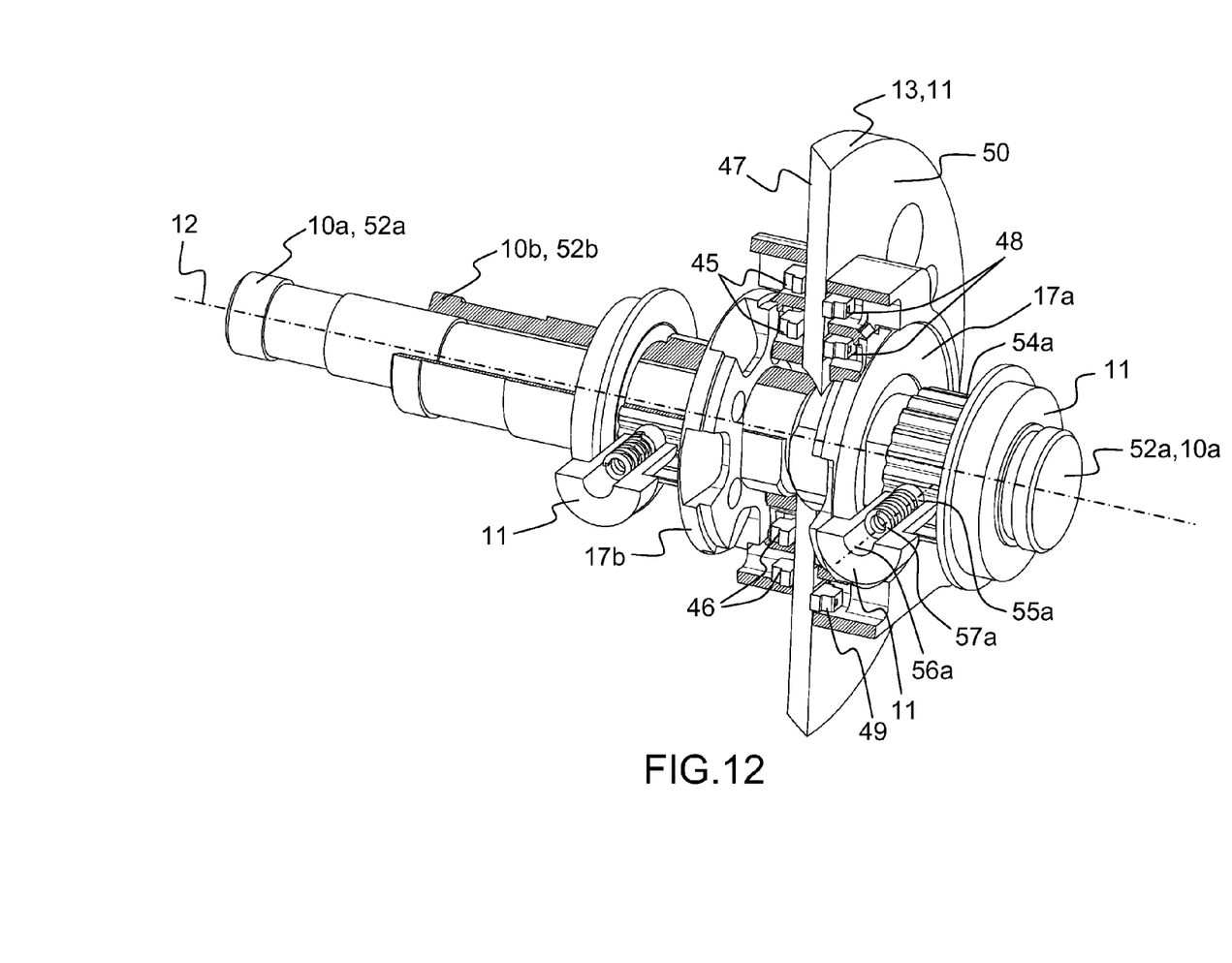
FIG. 12 represents an exemplary double encoder.

FIG. 12 represents an exemplary double encoder in which the printed circuit 13 carries four pairs of emitters and detectors, two pairs 45 and 46 fixed to a first face 47 of the printed circuit 13 and two pairs 48 and 49 fixed to a second face 50 of the printed circuit 13. The second face 50 is opposite to the first face 47. In a more general manner, the printed circuit 13 carries at least one pair on each of its faces. This encoder makes it possible to obtain, in a reduced bulk, a double data input device. The electrical functions of the encoder are all grouped together on a single printed circuit. Among these functions are essentially included the emitters, the receivers and their wiring.

A first input of data is effected by a first button 52a secured to a part 17a cooperating with the pairs 48 and 49. The first button 52a and the part 17a form a first movable element 10a that can move with respect to the fixed element 11.

A second input of data is effected by a second button 52b secured to a part 17b cooperating with the pairs 45 and 46. The second button 52b and the part 17b form a second movable element 10b that can move with respect to the fixed element 11. The parts 17a and 17b are similar to the part 17 previously described and fulfil the same functions. The parts 17a and 17b carry an alternating succession of regularly distributed marks 20 and of absence of mark. The buttons 52a and 52b are both concentric with the axis 12 and may be actuated separately.

Advantageously, the encoder comprises means for mechanically defining stable positions of the two elements 10 and 11 with respect to one another.

In the example represented in FIG. 12, these means comprise for example a notched wheel 54a secured to the movable element 10a and a ball 55a linked to the fixed element 11. The ball 55a is free in translation with respect to the fixed element 11 along a radial direction 56a of the fixed element 11. The ball 55a can move from one notch to another of the wheel 54a. The ball 55a may be thrust by a spring 57a, so as to keep it at the bottom of each notch. The stable positions of the movable element 10a with respect to the fixed element 11 are defined by the positions of the ball 55a at the bottom of each notch of the wheel 54a. Analogous means for defining stable positions of the movable element 10b with respect to the fixed element 11 are also represented in FIG. 12.

In the examples represented in FIGS. 1, 4, 5, 6 and 10, means for defining stable positions of the movable element 10 with respect to the fixed element 11 comprise a disc 60 belonging to the movable element 10. The disc 60 extends in a plane perpendicular to the axis 12 and is drilled with several holes 61. A ball 62 is linked to the fixed element 11. The ball 62 is free in translation with respect to the fixed element 11 along a direction 63 parallel to the axis 12. The holes 61 are arranged on the disc 60 in such a way that the ball 62 can move from one hole to another. The ball 62 may be thrust by a spring 64 along an axis 63 so as to keep it in each hole 61. The stable positions of the movable element 10 with respect to the fixed element 11 are defined by the positions of the ball 62 in each hole 61.

Figure 13:
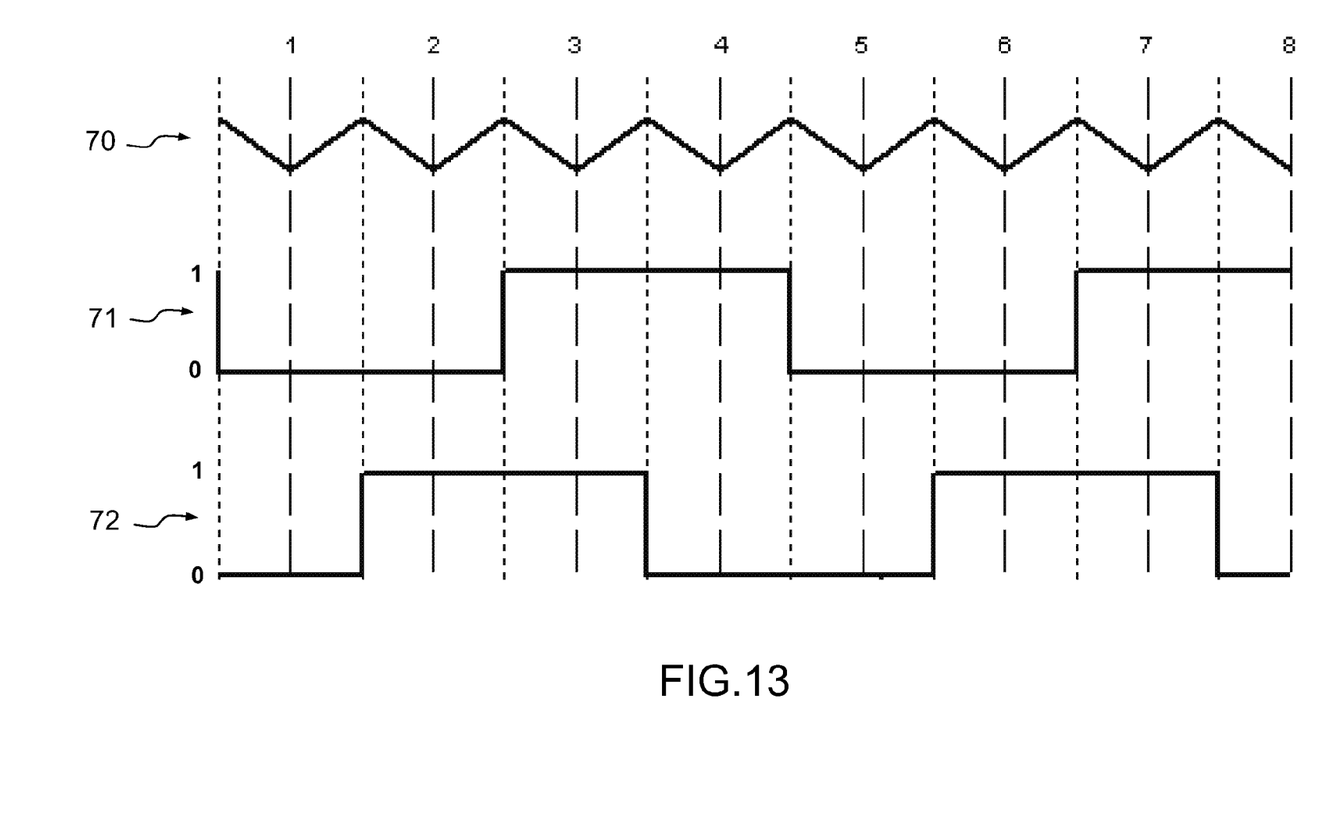
FIG. 13 represents an example of information obtained by means of an encoder comprising two pairs of emitters and detectors during the various relative positions defined in FIGS. 9a to 9d as well as in FIGS. 11a to 11d.

FIG. 13 represents the coding obtained by two detectors as a function of the stable positions of the movable element 10 with respect to the fixed element 11. Eight stable positions, numbered from 1 to 8, are represented in the top portion of FIG. 13. The displacement of the movable element 10 with respect to the fixed element 11 is represented horizontally in FIG. 13. A sawtooth broken line 70 represents the stable positions by symbolizing for example the notched wheel 54a. A curve 71 represents the coding obtained by means of the detector 14r or 41 and a curve 72 represents the coding obtained by means of the detector 15r or 42. The coding arising from the detectors is binary and can take two values denoted 0 and 1. The coding arising from the detector 14r or 41 takes the value 0 for the positions 1, 2, 5 and 6 and the value 1 for the positions 3, 4, 7 and 8. The coding arising from the detector 15r or 42 takes the value 0 for the positions 1, 4, 5 and 8 and the value 1 for the positions 2, 3, 6 and 7.

Positions 1 and 5 correspond to those represented in FIGS. 9c and 11c. Positions 2 and 6 correspond to those represented in FIGS. 9d and 11b. Positions 3 and 7 correspond to those represented in FIGS. 9a and 11a. Positions 4 and 8 correspond to those represented in FIGS. 9b and 11d.

What is claimed is:

1. An incremental optical encoder, comprising:
a movable element; a fixed element; at least one pair formed of a luminous emitter and of a luminous detector which are secured to the fixed element, the emitter producing a luminous radiation that the detector can detect; at least one mark secured to the movable element, wherein during the motion of the movable element with respect to the fixed element, the mark being able to place itself in the path of the luminous radiation to be detected by the detector; a plane printed circuit, secured to the fixed element and on which the pair of emitter and of detector is arranged; and an opaque mask secured to the printed circuit, the mask configured to limit the angular field of the luminous radiation, wherein the mask surrounds at least one of the emitter and the detector and comprises a window defining the angular field, the mark forms an element reflecting the radiation arising from the emitter towards the detector, the mask configured to avoid the establishment of a direct radiation between the emitter and the detector, and the encoder comprises a mask that can interrupt the luminous radiation by shutting off the window when the reflecting element does not return the radiation emitted by the emitter,
wherein the fixed element comprises a second luminous detector secured to the fixed element, the two detectors being able to detect one and the same mark, the dimensions of the mark are defined so as to be able to be detected either by neither of the two detectors, or by a single detector or by both detectors, and a length of a zone of the fixed element including the two detectors is less than a length of the mark, the lengths being measured in the direction of the displacement of the movable element with respect to the fixed element.

2. The optical encoder according to claim 1, wherein the encoder is rotary about an axis, and the plane of the printed circuit is perpendicular to the axis.

3. The optical encoder according to claim 2, wherein the emitter emits the luminous radiation around a first direction parallel to the axis, and the detector receives the luminous radiation around a second direction parallel to the axis.

4. The optical encoder according to claim 3, wherein the first direction is closer to the axis of the encoder than the second direction, the reflecting element is substantially centred on the first direction and forms a land substantially inclined with respect to the plane of the printed circuit, and an angle of inclination of the land is defined to return the radiation emitted by the emitter to the detector.

5. The optical encoder according to claim 1, wherein in the direction of displacement of the movable element with respect to the fixed element, the movable element comprises, on either side of the reflecting element, a mask that can interrupt the luminous radiation.

6. The optical encoder according to claim 1, wherein the encoder is rotary about an axis, the plane of the printed circuit is perpendicular to the axis, and the emitter is arranged nearer the axis of rotation of the encoder than the detectors.

7. The optical encoder according to claim 1, further comprising two movable elements that can move with respect to the fixed element, the printed circuit comprising: opposite faces; at least one first pair formed of a luminous emitter and of a luminous detector fixed to the first face of the printed circuit; at least one second pair formed of a luminous emitter and of a luminous detector fixed to the second face of the printed circuit; and at least one first mark secured to the first movable element, wherein during the motion of the first movable element with respect to the fixed element, the first mark being able to place itself in the path of the luminous radiation to be detected by the detector of the first pair and at least one second mark secured to the second movable element, during the motion of the second movable element with respect to the fixed element, the second mark being able to place itself in the path of the luminous radiation to be detected by the detector of the second pair.

8. The optical encoder according to claim 1, further comprising means for mechanically defining stable positions of the movable element with respect to the fixed element.

9. An incremental optical encoder, comprising:

a movable element; a fixed element; at least one pair formed of a luminous emitter and of a luminous detector which are secured to the fixed element, the emitter producing a luminous radiation that the detector can detect; at least one mark secured to the movable element, wherein during the motion of the movable element with respect to the fixed element, the mark being able to place itself in the path of the luminous radiation to be detected by the detector; a plane printed circuit, secured to the fixed element and on which the pair of emitter and of detector is arranged; and an opaque mask secured to the printed circuit, the mask configured to limit the angular field of the luminous radiation, wherein the mask surrounds at least one of the emitter and the detector and comprises a window defining the angular field, the mark forms an element reflecting the radiation arising from the emitter towards the detector, the mask configured to to avoid the establishment of a direct radiation between the emitter and the detector, and the encoder comprises a mask that can interrupt the luminous radiation by shutting off the window when the reflecting element does not return the radiation emitted by the emitter, wherein the encoder is rotary about an axis, and the plane of the printed circuit is perpendicular to the axis, wherein the emitter emits the luminous radiation around a first direction parallel to the axis, and the detector receives the luminous radiation around a second direction parallel to the axis, and wherein the first direction is closer to the axis of the encoder than the second direction, the reflecting element is substantially centred on the first direction and forms a land substantially inclined with respect to the plane of the printed circuit, and an angle of inclination of the land is defined to return the radiation emitted by the emitter to the detector.

* * * * *